M. CHANDLER & J. B. NICKELS.
HORSE HOE
No. 62,181.
Patented Feb. 19, 1867.
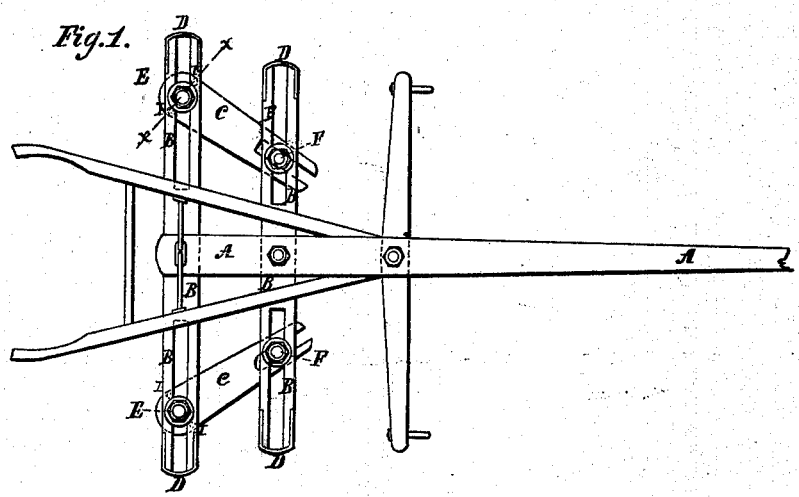
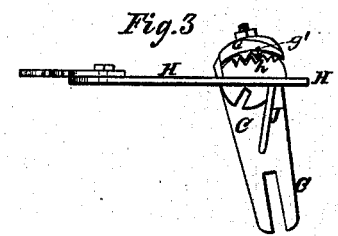
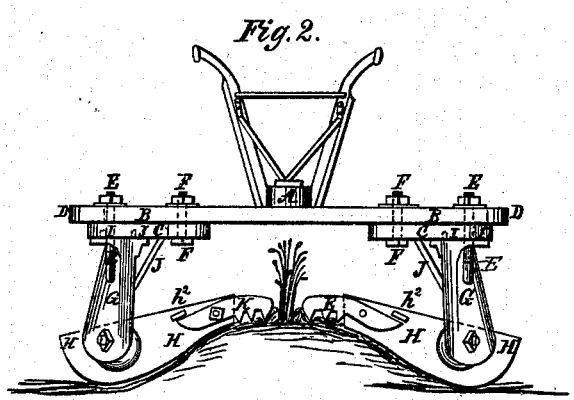
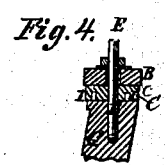
Witnesses.
Theo. Tusche,
J. A. Service
Inventor.
Moses Chandler.
Jno B Nickels
Per. Munn & Co.
Attorneys.

United States Patent Office.

MOSES CHANDLER, OF CORINTH, MAINE, AND JOHN B. NICKELS, OF KENDUSKEAG, MAINE, ASSIGNORS TO V. S. PALMER AND J. B. NICKELS.

Letters Patent No. 62,181, dated February 19, 1867.

IMPROVEMENT IN HORSE HOES.

The Schedule referred to in these Letters Patent and making part of the same.

TO ALL WHOM IT MAY CONCERN:

Be it known that we, MOSES CHANDLER, of Corinth, and JOHN B. NICKELS, of Kenduskeag, in the county of Penobscot, and State of Maine, have invented a new and useful Improvement in Horse Hoe; and we do hereby declare that the following is a full, clear, and exact description thereof, which will enable others skilled in the art to make and use the same, reference being had to the accompanying drawings, forming part of this specification, in which—

Figure 1 is a top view of our improved horse hoe.
Figure 2 is a rear view of the same.
Figure 3 is a detail under side view of a wing, standard, and cap detached from the machine.
Figure 4 is a detail sectional view of the same, taken through the line $x\ x$, fig. 1.

Similar letters of reference indicate like parts.

Our invention consists in adjustably attaching the wings or blades formed as described to the standards; in the combination of ratchet-teeth with the wings and with the standards; in the combination of pivoted rake-heads with the free or rear ends of the wings or blades; in securing the uprights to the adjustable cops by angular bolts and steady-pins; in the combination of stay-braces with the uprights and adjustable cops; and in the combination of the adjustable slotted cops and slotted cross-bars having bands around their ends with each other and with the tongue or draught-beam; the whole being constructed and arranged as hereinafter more fully described.

A is the tongue or draught-beam of the machine; B are cross-bars bolted or otherwise securely attached to the draught A. The ends of the cross-bars B are slotted, as shown in fig. 1, for the adjustable attachment of the caps C. D are bands passing around and secured to the ends of the slotted cross-bars B, to strengthen them and support them against the action of the bolts passing through the slots. The caps C are secured to the cross-bars B, by the bolts E and F, and their forward ends, through which the bolts F pass, are slotted so that their positions with reference to said cross-bars may be adjusted at pleasure. G are the uprights, to the lower ends of which the blades or wings H are attached, and the upper ends of which are secured to the caps C by the bolts E and steady-pins I. The bolts E are angular; that is to say they pass horizontally through the body of the uprights G, turn at right angles, and pass up through the rear ends of the caps C and through the slots in the ends of the rear cross-bar B, thus at the same time securing the uprights G to the caps C, and the said caps to the cross-bars B, as shown in figs. 1, 2, and 4. The steady-pins I are securely attached to the upper ends of the uprights G, and enter holes in the under sides of the caps C, as shown in fig. 4 and in dotted lines in figs. 1 and 2. J are stay-braces, the lower ends of which are secured to the uprights G, and their upper ends to the caps C, so as to strengthen the said uprights. The ends of the braces J may be secured by nuts or in any other substantial manner. H are the blades or wings, which are secured to the lower ends of the uprights G by single bolts, as shown in figs. 2 and 3. The blades or wings H may be made adjustable by having teeth or cogs, $h^1$, formed upon or attached to the rear sides of said wings, which take hold of teeth or cogs, $g^1$, formed upon or attached to the front sides of the lower ends of the uprights G, as shown in fig. 3, so that the said wings H may be held securely in any position in which they may be placed. The lower edges of the forward ends of the blades H, which are attached to the uprights G, are made circular, as shown in fig. 2, so as to furrow the ground to the same depth, in whatever position they may be adjusted. The lower edges of the rear parts of said blades are hollowed out or curved so as to give the desired form to the ridge or row being cultivated. K are rake-heads pivoted to the rear ends of the wings or blades H, and which are kept from dropping down too far by the stops $h^2$ formed upon or attached to the rear sides of the said blades H. These rake-heads carry the loose dirt that passes around the end of the blades to the plants being cultivated, and spread it evenly around them.

What we claim as new, and desire to secure by Letters Patent, is—

1. Adjustably attaching the wings or blades H, when formed as described, to the uprights G, substantially as and for the purpose set forth.

2. The combination of teeth or cogs with the blades H and uprights G, substantially as herein shown and described and for the purpose set forth.

3. The combination of the pivoted rake-heads K with the blades or wings H, substantially as herein shown and described and for the purpose set forth.

4. Securing the uprights G to the caps C, and to the slotted cross-bars B, by means of angular bolts E, and steady-pins I, substantially as herein shown and described.

5. The combination of the stay-braces J with the uprights G, and adjustable caps C, substantially as herein shown and described.

6. The combination of the adjustable slotted caps C and slotted cross-bars B, having bands, D, around their slotted ends, with each other and with the draught-beam A, substantially as herein shown and described.

MOSES CHANDLER,
JOHN B. NICKELS.

Witnesses:
D. E. HALL,
F. HARVEY.